US010017285B2

(12) United States Patent
Boudreau et al.

(10) Patent No.: US 10,017,285 B2
(45) Date of Patent: Jul. 10, 2018

(54) APPARATUS AND METHOD FOR GROUPING AND POSITIONING ITEMS (71) Applicant: PREMIER TECH TECHNOLOGIES LTEE, Riviere-du-Loup (CA)

(72) Inventors: Jean-Robert Boudreau, Riviere-du-Loup (CA); Michel Corriveau, Lorraine (CA); Yannick Savard, St-Arsene (CA); Sebastien Soucy, Riviere-du-Loup (CA)

(73) Assignee: PREMIER TECH TECHNOLOGIES LTEE, Riviere-du-Loup, Quebec (CA)

( * ) Notice: Subject to any disclaimer, the term of this patent is extended or adjusted under 35 U.S.C. 154(b) by 695 days.

(21) Appl. No.: 14/516,251

(22) Filed: Oct. 16, 2014

(65) Prior Publication Data

US 2016/0039550 A1 Feb. 11, 2016

Related U.S. Application Data (60) Provisional application No. 62/033,400, filed on Aug. 5, 2014.

(51) Int. Cl.
*B65B 35/58* (2006.01)
*B65B 35/36* (2006.01)
*B65G 61/00* (2006.01)
*B65G 47/46* (2006.01)
*B65G 57/03* (2006.01)
(Continued)

(52) U.S. Cl.
CPC ............ *B65B 35/58* (2013.01); *B25J 9/0051* (2013.01); *B25J 9/0084* (2013.01); *B65B 35/36* (2013.01); *B65B 35/38* (2013.01); *B65G 47/46* (2013.01); *B65B 2220/16* (2013.01); *B65G 57/03* (2013.01); *B65G 61/00* (2013.01); *B65G 2201/02* (2013.01)

(58) Field of Classification Search
CPC . B65B 2220/16; B65B 2220/18; B65B 35/58; B65B 35/50; B65B 35/36; B65B 35/38; B65G 57/03; B65G 47/26; B65G 57/02; B65G 57/00
USPC .......... 53/446, 531; 414/789.2, 788.1, 790.9, 414/790.2; 198/389
See application file for complete search history.

(56) References Cited

U.S. PATENT DOCUMENTS 5,251,422 A * 10/1993 Goodman ............... B65B 5/061
53/251
6,374,984 B1 * 4/2002 Nagler ................... B07C 5/361
177/1

(Continued)

*Primary Examiner* — Robert Long
*Assistant Examiner* — Xavier A Madison
(74) *Attorney, Agent, or Firm* — Merchant & Gould P.C.

(57) ABSTRACT

An apparatus displaces and positions items in a predetermined configuration. The apparatus includes a grouping station, a grouping manipulator using at least two degrees of freedom and having a prehension end-effector and a placing manipulator using at least four degrees of freedom and having a prehension end-effector. The grouping manipulator is configured to pick items at a first item location, displace the items towards the grouping station, and release the items at the grouping station to form a group of items. The placing manipulator is configured to pick the group of items at the grouping station, change an orientation of the group of items, and release the group of items at a receiving station in the predetermined configuration. A method displaces and positions items in a predetermined configuration.

33 Claims, 6 Drawing Sheets (51) Int. Cl.
*B65B 35/38* (2006.01)
*B25J 9/00* (2006.01)

(56) References Cited

U.S. PATENT DOCUMENTS

| | | | | |
|---|---|---|---|---|
| 6,438,925 | B1* | 8/2002 | Straub | B65B 5/108 53/244 |
| 6,520,317 | B2* | 2/2003 | Sherwin | B65B 5/105 198/436 |
| 7,644,558 | B1* | 1/2010 | Fallas | B25J 9/0093 53/251 |
| 7,941,990 | B2* | 5/2011 | Aquarius | B65B 5/105 53/147 |
| 8,997,438 | B1* | 4/2015 | Fallas | B65G 47/914 414/222.01 |
| 2013/0291493 | A1* | 11/2013 | Laudet | B65B 5/08 53/475 |

* cited by examiner

APPARATUS AND METHOD FOR GROUPING AND POSITIONING ITEMS

CROSS-REFERENCE TO RELATED APPLICATIONS

This application claims priority under 35 USC § 119(e) of U.S. provisional patent application 62/033,400 filed on Aug. 5, 2014, the specification of which is hereby incorporated by reference.

FIELD OF THE INVENTION

The present invention relates to the field of packaging. More particularly, it relates to an apparatus and a method for grouping and positioning items. Even more particularly, it relates to an apparatus and a method for packing items in a container such as a box according to a predetermined configuration, such as a display ready configuration.

BACKGROUND

Several types of packaging apparatuses and methods are known in the art for packing items in a container, for example by transferring the items from a carrier, such as a conveyor, to the container using automated manipulator assemblies including and without being limitative robotic manipulator assemblies and dedicated automated manipulator assemblies, which are configured and designed to grasp and move items with a number of degrees of freedom. Dedicated automated manipulator assemblies are conceived for a predetermined application and may be difficult to modify if the application changes. They include a combination of mobile components, such as and without being limitative, slidable, rotatable, translatable, jointed, and/or pivotable components, that are combined in accordance with the task to be performed and cooperate to manipulate items. For instance and without being limitative, they can include servo-motors, conveyors, pushers, rotatable platforms, and the like. Robotic manipulator assemblies, i.e. assemblies including a robot with a robot arm, are easier to modify if the application changes, however, known robotic manipulator assemblies tend to suffer from several drawbacks.

For example, parallel robots have two to four degrees of freedom and allow the items to be picked from the carrier and to be subsequently, displaced and/or rotated to modify a direction of the item to be inserted into a corresponding container. Parallel robots operate rapidly and can regroup a large quantity of items in a short period of times. However, such robotic manipulator assemblies offer a limited control over the positioning of the items inside the container, as the items can be displaced along the axes X, Y and/or Z and only rotated about one axis to change a direction thereof, while remaining substantially oriented according to the same plane to which they are carried on the carrier. Therefore, such apparatuses can only be used in systems requiring low agility, i.e. where the orientation of the items inside the container is substantially similar to the orientation of the items on the carrier.

However, in many cases, orientation of the items in the container is an important aspect of the packaging process. For example and without being limitative, modification of the orientation of the items may be required for packaging of the items in the container in a "display ready" configuration. In such a configuration, the items are disposed in the container such as to allow direct display of the items in stores, simply by removing a predefined section of the container. Indeed, the original positioning of the items in the container is such that, once the predefined section of the container has been removed, the items are already advantageously displayed, without requiring further placement of the items by a clerk.

Serial (or articulated) robots which can further perform a change in the orientation of the items are also known. Such robotic manipulator assemblies commonly have up to six degrees of freedom and allow the items to be picked from the carrier and to be subsequently, displaced and rotated to modify their direction and/or orientation to be inserted into a corresponding container. Serial manipulators therefore allow the items to be oriented inside the corresponding container according to a predetermined configuration, which can differ from the orientation of the items on the carrier. However, serial manipulators tend to be slower in operation and require a greater amount of time for picking each item and inserting the item in the corresponding container, which may slow down the packaging process.

In view of the above, there is a need for an improved apparatus and a method for grouping and positioning items which would be able to overcome or at least minimize some of the above-discussed prior art concern.

SUMMARY OF THE INVENTION

According to a first general aspect, there is provided an apparatus for displacing and positioning items in a predetermined configuration. The apparatus comprises a grouping station, a grouping manipulator using at least two degrees of freedom and having a prehension end-effector and a placing manipulator using at least four degrees of freedom and having a prehension end-effector. The grouping manipulator is configured to pick items at a first item location, displace the items towards the grouping station, and release the items at the grouping station to form a group of items. The placing manipulator is configured to pick the group of items at the grouping station, change an orientation of the group of items, and release the group of items at a receiving station in the predetermined configuration.

In an embodiment, the apparatus further comprises an item carrier from which the items are picked at the first item location by the grouping manipulator.

In an embodiment, the item carrier extends along a production line aligned with an axis "X", having a transversal axis "Z". The axes "X" and "Z" are perpendicular to an axis "Y". The prehension end-effector of the grouping manipulator is displaceable along at least the "Y" and "Z" axes and is rotatable around the "Y" axis.

In an embodiment, the prehension end-effector of the grouping manipulator is further displaceable along the "X" axis.

In an embodiment, the receiving station is inside a container and the apparatus further comprises a container carrier supporting and displacing the container.

In an embodiment, the grouping manipulator comprises a parallel robot.

In an embodiment, the prehension end-effector of the grouping manipulator comprises at least one prehension device operative to pick, maintain and release the items.

In an embodiment, the at least one prehension device comprises at least one vacuum gripper.

In an embodiment, the grouping manipulator is rotatable to perform a change of direction of a picked item, between the first item location and the grouping station.

In an embodiment, the prehension end-effector of the grouping manipulator is rotatable to perform the change of direction of the picked item, between the first item location and the grouping station.

In an embodiment, the grouping manipulator has three or four degrees of freedom.

In an embodiment, the placing manipulator comprises a serial robot.

In an embodiment, the serial robot has five or six degrees of freedom.

In an embodiment, the prehension end-effector of the placing manipulator is displaceable along the "X", "Y" and "Z" axes and is rotatable about at least one of the "X" and "Z" axes.

In an embodiment, the prehension end-effector of the placing manipulator comprises at least one prehension device operative to pick, maintain and release the items.

In an embodiment, the at least one prehension device comprises a mechanical gripper with at least one upper finger and at least one lower finger displaceable with respect to one another and configurable to grasp and release the group of items therebetween.

According to another general aspect, there is also provided a method of displacing and positioning items in a predetermined configuration. The method comprises the steps of: picking the items from a first item location and grouping the items into a group of items at a grouping station; and picking the group of items, varying an orientation of the group of items and releasing the group of items at a receiving station in the predetermined configuration.

In an embodiment, grouping of the items into the at least one group of items is performed by stacking the items into a stack.

In an embodiment, the step of picking the items from a first item location and grouping the items into a group of items at a grouping station comprises the sub-step of rotating the items to change a direction thereof.

In an embodiment, the step of picking the items from a first item location and grouping the items into a group of items at a grouping station comprises the sub-step of seizing the at least one item by an upper face thereof.

In an embodiment, the step of picking the items from a first item location and grouping the items into a group of items at a grouping station comprises suctioning the at least one item.

In an embodiment, the step of picking the items from a first item location and grouping the items into a group of items at a grouping station comprises picking at least two of the items sequentially.

In an embodiment, the step of picking the items from a first item location and grouping the items into a group of items at a grouping station comprises picking at least two of the items simultaneously.

In an embodiment, the step of picking the items from a first item location and grouping the items into a group of items comprises the sub-step of displacing the at least one item from the first item location to the grouping station.

In an embodiment, the sub-step of displacing the at least one item from the first item location to the grouping station comprises displacing the at least one item along a first axis and a second axis perpendicular to the first axis.

In an embodiment, the step of picking the group of items, varying an orientation of the group of items and releasing the group of items at a receiving station in the predetermined configuration comprises the sub-step of clamping the group of items.

In an embodiment, the receiving station comprises a receiving space defined in a container and the step of picking the group of items, varying an orientation of the group of items and releasing the group of items at a receiving station in the predetermined configuration comprises releasing the group of items in the receiving space of the container.

In an embodiment, the method further comprises the step of supporting and displacing the container.

In an embodiment, the method further comprises the step of conveying the items along a production line including the first item location.

In an embodiment, the production line is aligned with an axis "X" and has a transversal axis "Z". The axes "X" and "Z" are perpendicular to an axis "Y". The step of picking the items from a first item location and grouping the items into a group of items at a grouping station comprises displacing the at least one item along at least one of the axes "Z" and "Y".

In an embodiment, the step of picking the items from a first item location and grouping the items into a group of items at a grouping station further comprises rotating the at least one item around the axis "Y".

In an embodiment, the step of picking the group of items, varying an orientation of the group of items and releasing the group of items at a receiving station in the predetermined configuration comprises displacing the group of items along the axis "Y" and at least one of the axes "X" and "Z" and rotating the group of items about at least one of the axes "X" and "Z".

According to yet another general aspect, there is also provided, an apparatus for placing items in a predetermined configuration. The apparatus comprises a first item location configured to receive items in a first item orientation; a grouping station spaced-apart from the first item location and configured to receive items in the first item orientation; a receiving station spaced-apart from the first item location and the grouping station and configured to receive items in a receiving orientation different from the first item orientation; a grouping manipulator having a prehension end-effector and being configured to pick items at the first item location, displace the items towards the grouping station, and release the items in the first item orientation on the grouping station to group the items into a group of items; and a placing manipulator having a prehension end-effector and being rotatable about at least one rotation axis, the placing manipulator being configured to pick the group of items at the grouping station, displace the group of items towards the receiving station, rotate the group of items from the first item orientation to the receiving orientation, and release the group of items at the receiving station in the predetermined configuration.

In an embodiment, the grouping manipulator uses at least two degrees of freedom and the placing manipulator uses at least four degrees of freedom.

In an embodiment, the grouping manipulator has three or four degrees of freedom.

In an embodiment, the grouping manipulator comprises a parallel robot.

In an embodiment, the placing manipulator has five or six degrees of freedom.

In an embodiment, the placing manipulator comprises a serial robot.

In an embodiment, the grouping manipulator is rotatable to perform a change of direction of a picked item, between the first item location and the grouping station.

In an embodiment, the prehension end-effector of the grouping manipulator is rotatable to perform the change of direction of the picked item, between the first item location and the grouping station.

In an embodiment, the prehension end-effector of the placing manipulator comprises at least one prehension device operative to pick, maintain and release the items.

In an embodiment, the at least one prehension device comprises a mechanical gripper with at least one upper finger and at least one lower finger displaceable with respect to one another and configurable to grasp and release the group of items therebetween.

In an embodiment, the apparatus further comprises an item carrier from which the items are picked at the first item location by the grouping manipulator.

In an embodiment, the item carrier extends along a production line aligned with an axis "X", having a transversal axis "Z". The axes "X" and "Z" are perpendicular to an axis "Y". The prehension end-effector of the grouping manipulator is displaceable along at least the "Y" and "Z" axes and is rotatable around the "Y" axis.

In an embodiment, the prehension end-effector of the grouping manipulator is further displaceable along the "X" axis.

In an embodiment, the prehension end-effector of the placing manipulator is displaceable along the "X", "Y" and "Z" axes and is rotatable about at least one of the "X" and "Z" axes.

In an embodiment, the prehension end-effector of the grouping manipulator picks the item by an upper face thereof.

In an embodiment, the items have a plane aligned with a support surface of the items at the first item location and an orientation of the plane of the items remains unchanged by the grouping manipulator.

In an embodiment, the items have a direction at the first item location and the grouping manipulator is rotatable to change the direction of the items between the first item location and the grouping station.

In an embodiment, the receiving station is a receiving space defined inside a container and the apparatus further comprises a container carrier supporting and displacing the container.

In an embodiment, a support surface of the items at the first item location is substantially parallel to the support surface of the items at the grouping station.

In an embodiment, at the first item location, the items are received in a first direction, and at the grouping station, the items are received in a second direction, different from the first direction. In an embodiment, at the receiving station, the items are received in the second direction.

According to yet another general aspect, there is also provided a method of displacing and placing items in a predetermined configuration, the method comprising the steps of: picking at least one item in a first item orientation from a first item location; displacing the at least one item from the first item location to a grouping station; releasing the at least one item at the grouping station in the first item orientation to form a group of items at the grouping station; picking the group of items at the grouping station; displacing the group of items towards a receiving station; changing an orientation of the group of items from the first item orientation to a receiving orientation; and releasing the group of items at the receiving station in the predetermined configuration.

In an embodiment, the steps of picking at least one item in a first item orientation from a first item location, displacing the at least one item from the first item location to a grouping station and releasing the at least one item at the grouping station in the first item orientation to form a group of items at the grouping station are carried out at least twice to form the group of items.

In an embodiment, the step of displacing the at least one item from the first item location to a grouping station comprises rotating the at least one item to change a direction of the at least one item.

In an embodiment, each one of the at least one item comprises a plane aligned with a support surface at the first item location and the step of displacing the at least one item from the first item location to a grouping station comprises rotating the at least one item about an axis perpendicular to its plane to change a direction thereof.

In an embodiment, each one of the at least one item comprises a plane aligned with a support surface at the first item location and the step of changing an orientation of the group of items from the first item orientation to a receiving orientation comprises rotating the group of items about an axis substantially aligned with the plane of the items to change the orientation of the group of items.

In an embodiment, the step of picking at least one item in the first item orientation from the first item location comprises seizing the at least one item by an upper face thereof.

In an embodiment, the step of picking at least one item in the first item orientation from the first item location comprises suctioning the at least one item.

In an embodiment, the step of picking at least one item in the first item orientation from the first item location comprises picking at least two items sequentially.

In an embodiment, the step of picking at least one item in the first item orientation from the first item location comprises picking at least two items simultaneously.

In an embodiment, the step of displacing the at least one item from the first item location to the grouping station comprises displacing the at least one item along a first axis and a second axis perpendicular to the first axis.

In an embodiment, the step of picking the group of items at the grouping station comprises clamping the group of items.

In an embodiment, the receiving station comprises a receiving space defined in a container, and the step of displacing the group of items towards a receiving station comprises inserting the group of items in the receiving space of the container.

In an embodiment, the method further comprises the step of conveying the items along a production line including the first item location.

In an embodiment, the production line is aligned with an axis "X" and has a transversal axis "Z". The axes "X" and "Z" are perpendicular to an axis "Y". The step of displacing the at least one item from the first item location to a grouping station comprises displacing the at least one item along at least one of the axes "Z" and "Y".

In an embodiment, the step of displacing the at least one item from the first item location to a grouping station further comprises rotating the at least one item around the axis "Y".

In an embodiment, the steps of displacing the group of items towards the receiving station and changing an orientation of the group of items from the first item orientation to a receiving orientation comprise displacing the group of items along the axis "Y" and at least one of the axes "X" and "Z" and rotating the group of items about at least one of the axes "X" and "Z".

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 1 includes FIGS. 1a, 1b, 1c, and 1d, where

FIG. 4 includes FIGS. 4a and 4b, FIG. 4b is a top view of the items configured in the container, according to the embodiment of FIG. 4a.

FIG. 5 includes FIGS. 5a and 5b, FIG. 5b is a top view of the items configured in the container, according to the embodiment of FIG. 5a.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the apparatus for grouping and positioning items consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, can be used for the apparatus for grouping and positioning items, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1A:
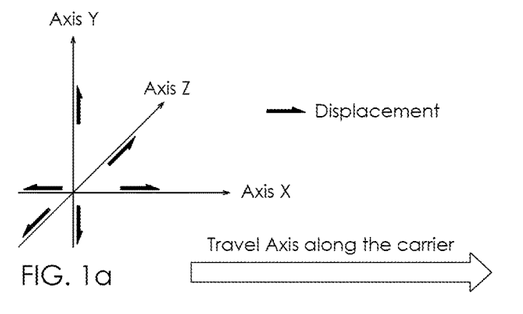
FIG. 1a is a schematic representation of a coordinate system including axes "X", "Y", and "Z" along which an item can be displaced and a production line aligned with axis "X" along which the item is conveyed.
Figure 1B:
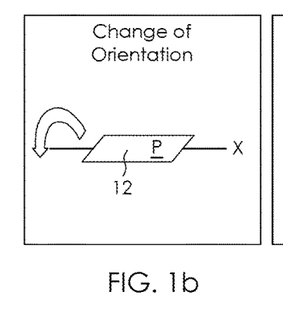
FIG. 1b is a schematic representation of a change of an orientation of an item conveyed along a travel axis by rotation around an axis "X"
Figure 1C:
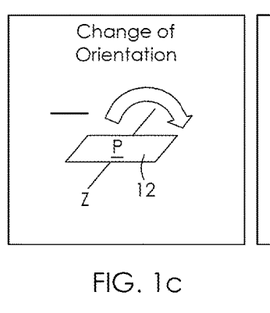
FIG. 1c is a schematic representation of a change of an orientation of the item conveyed along the travel axis by rotation around an axis "Z" and FIG. 1d is a schematic representation of a change of a direction of the item conveyed along the travel axis item by rotation around an axis "Y".
Figure 1D:
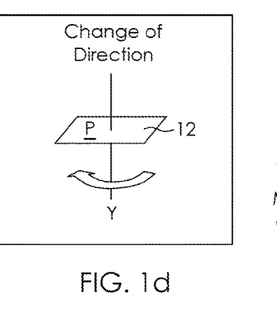

In reference to FIGS. 1a to 1d, there is shown an item 12 to be configured into a predetermined configuration at a receiving station. To reach the receiving station, the item can be displaced along axes "X", "Y", and/or "Z". To reach the receiving station in the predetermined configuration, the orientation and/or the direction of the item 12 can need to be modified. The item 12 is characterized by a plane "P" which corresponds to the orientation of its support surface before the item 12 is first grasped by an apparatus, in a production line aligned along an axis "X". Thus, the plane "P" substantially corresponds to the orientation of the support surface of the item 12 at a first item location, before being grasped by the apparatus. The support surface of the item 12 is the surface of the item 12 which is in contact with an item carrier 16a, such as a conveyor, or another carrier or supporting member. In the course of the present document, the term "orientation" is used to describe the configuration of the item 12 with regards to its plane "P", i.e. a change of orientation is understood to mean a change in the inclination of the item 12 with regards to its plane "P". Thus, to perform a change of orientation, the item 12 is rotated about a rotation axis parallel to its plane "P", i.e. either axis "X" (see FIG. 1a) or axis "Z" (see FIG. 1b). In opposition, the term "direction" is used to describe the configuration of the item 12 with regards to the rotation axis "Y", perpendicular to the plane "P", i.e. a change of direction is understood to mean a rotation of the item 12 while remaining in the same plane "P". Thus, to perform a change of direction, the item 12 is rotated about the axis "Y" perpendicular to the plane "P", as shown in FIG. 1c.

Figure 2:
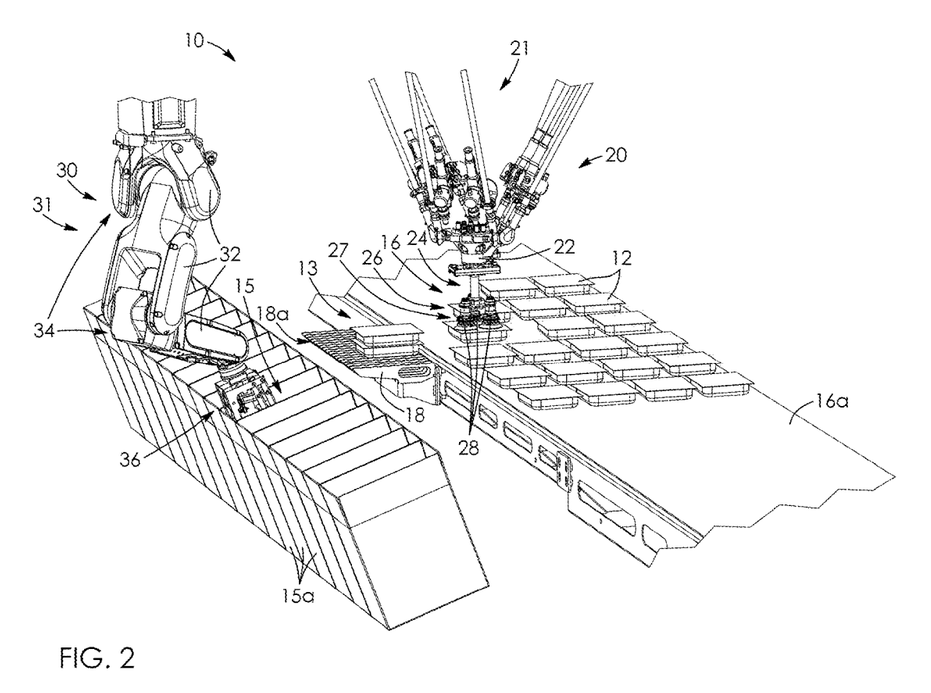
FIG. 2 is a perspective view of an apparatus for grouping and positioning items, according to an embodiment, wherein a placing manipulator is shown in a configuration where it places items in a container.
Figure 3A:
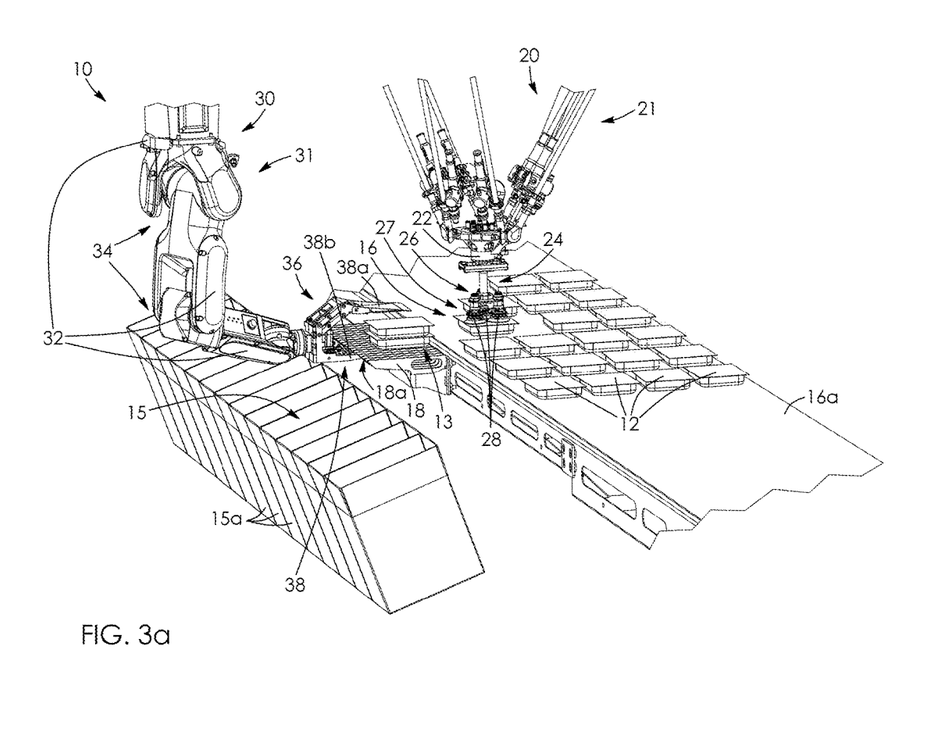
FIGS. 3a and 3b are respectively a right side perspective view and a left side perspective view of the apparatus of FIG. 2, wherein the grouping manipulator is about to grasp a group of items grouped on a grouping station.
Figure 3B:
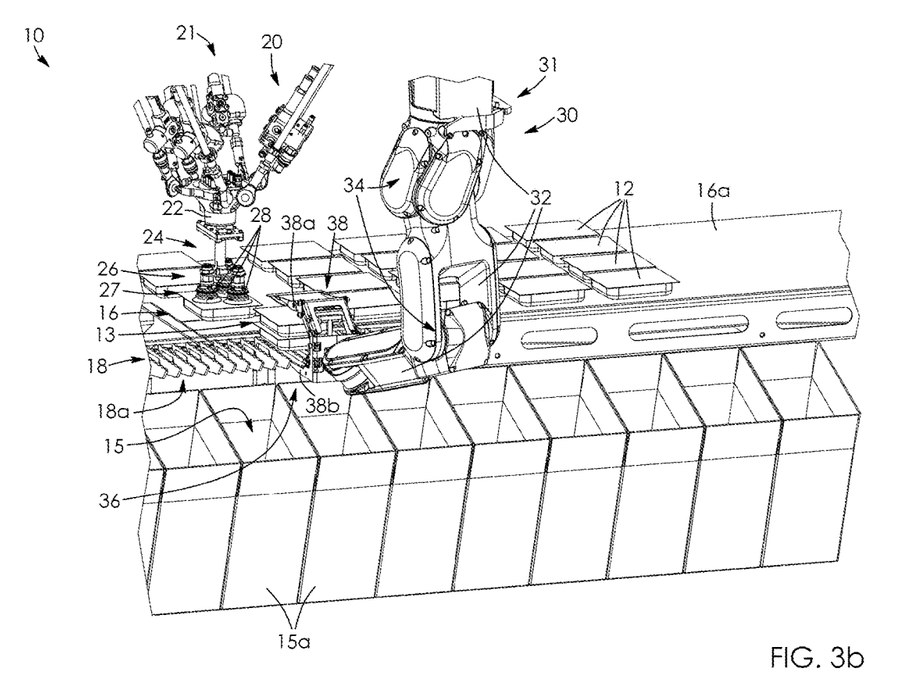

Referring generally to FIGS. 2, 3a and 3b, in accordance with an embodiment, there is provided an apparatus 10 for grouping and positioning items to reach the predetermined configuration at a receiving station 15. For instance, the apparatus 10 can be used to pack items 12 in a container 15a having a receiving space defined therein and which acts as the receiving station 15. The apparatus 10 includes a grouping manipulator 20 and a placing manipulator 30 which cooperate to pick items 12 from a first item location 16, such as a section of an item carrier 16a extending along a production line parallel to the axis "X", group the items at a grouping station 18, and place the items 12 on or in the receiving station 15, such as the receiving space defined in the container 15a. It is appreciated that the receiving station 15 can differ from the receiving space defined in the container 15a of the embodiment shown. For instance and without being limitative, the receiving station 15 can include a bag, different types of open top containers, a carrier with partition walls, or the like.

The first item location 16 is configured to receive items in a first item orientation and corresponds to the position of an item 12 along the production line where it is first grasped by the apparatus 10. As mentioned above, in the present description the first item location 16 defines the plane "P" by supporting the items 12 on their support surface. Thus, the first item location 16 can be different for different items 12. One skilled in the art will understand that, in an embodiment, the first item location 16 can be different from the section of the item carrier 16a shown. For example and without being limitative, in an embodiment, the first item location 16 can be a surface at a bottom of a chute, or the like.

In a non-limitative embodiment, the grouping manipulator 20 is one of a robotic manipulator assembly and a dedicated automated manipulator assembly in proximity of the first item location 16, such as the section of the item carrier 16a, and operative to pick the items 12 from the first item location 16, displace the items 12, and group the items 12 at the grouping station 18, in the first item orientation, to form at least one group of items 13. A group of items includes at least two items 12. The grouping station 18 is located proximate to first item location 16, within reach of the grouping manipulator 20. In an embodiment, the picked items are grouped by forming stacks of items 12. One skilled in the art would however understand that, in an alternative embodiment, the picked items 12 can be grouped into formations different from a stack, such as and without being limitative, in a side-by-side configuration and/or a combination of side-by-side and stack configuration. Moreover, it will be understood that, while each group of items 13 includes a plurality of items 12, the number of items in each group can vary according to different embodiments.

For example and without being limitative, in an embodiment, the grouping manipulator 20 is a parallel manipulator, such as and without being limitative, a delta robot 21. In an embodiment, the delta robot 21 has a rotatable section 24 connected to the movable end platform 22 such that the delta robot 21 has four degrees of freedom. Three degrees of freedom are provided by the translation of the end platform 22, i.e. movement according to the "X" axis along the production line, the "Z" axis transversal to the production line and/or the "Y" axis perpendicular (or normal) to both the "X" and "Z" axes, without modification of the orientation of the item (i.e. the orientation of the plane "P" of the item 12 is unchanged). A prehension end-effector 26 is connected to the end platform 22. The prehension end-effector 26 includes a prehension device which is designed to interact and, more particularly, seize, grasp or pick the items 12 at the first item location 16, hold them during a displacement thereof and release the items 12 at the grouping station 18. The nature of the prehension device of the prehension end-effector 26 can vary in accordance with the characteristics of the items to be seized, grasped or picked and displaced. In the embodiment shown, which provides a change of direction of the items 12, the fourth degree of freedom is provided by rotation of the rotatable section 24 and the prehension end-effector 26 at the bottom end thereof. One skilled in the art will understand that, in an embodiment, the grouping manipulator 20 can be free of rotatable section 24, thereby having only three degrees of freedom. Furthermore, the grouping manipulator 20 can have or use two or three degrees of freedom including one degree of freedom to perform a change of direction of the items 12. Moreover, it will also be understood that, in an alternative embodiment, another assembly can provide the fourth degree of freedom to the grouping manipulator 20.

It is also appreciated that the grouping manipulator 20 and/or the placing manipulator 30 can have a higher number of degrees of freedom than it is using to perform its task. Moreover, one skilled in the art will understand that, in the course of the present description for both the grouping manipulator 20 and the placing manipulator 30, the term "having" with reference to the amount of degrees of freedom of a manipulator refers to the amount of degrees of freedom that the manipulator effectively has, while the term "using" refers to the amount of degrees of freedom that a manipulator effectively uses to perform its task, i.e. in an embodiment a manipulator can have more degrees of freedom than it actually uses to perform its task.

In an embodiment, the grouping manipulator 20 does not perform a change of orientation of the items 12. Therefore, the grouping manipulator does not rotate the items about axes "X" and "Z". The grouping manipulator 20 can have the degrees of freedom to perform the change of orientation but these degrees of freedom are not used by the grouping manipulator 20 to perform its task. Thus, in an embodiment, the task performed by the grouping manipulator 20 is free of orientation change.

In the shown and non-limitative embodiment, the prehension device of the prehension end-effector 26 is a vacuum gripper 27 with suction cups 28 activable to capture and temporarily maintain the items 12 by an upper face thereof during displacement and, optionally, rotation about axis "Y" thereof to change their directions. In the shown and non-limitative embodiment, the vacuum gripper 27 has three suction cups 28 mounted in a triangular configuration. One skilled in the art will understand that, in an alternative embodiment, the vacuum gripper 27 can present a different configuration, such as a different number of suction cups 28 and/or suction cups 28 configured according to a different configuration can be provided to provide the sufficient negative pressure to generate the suction force to capture and maintain the items 12 in contact therewith. In an embodiment, the vacuum gripper 27 is activated for capturing the items 12 from the first item location 16 and temporarily maintaining the items 12 during displacement and, optionally, rotation thereof about axis "Y", i.e. change of direction. The vacuum gripper 27 is subsequently deactivated in order to release the items 12 on top of one another, at the grouping station 18, in order to form a stack or any other suitable configuration such as and without being limitative a side-by-side configuration.

It will be understood that, in an alternative embodiment, other prehension devices can be used to generate the desired prehension and retention force, such as, without being limitative, a mechanical gripper, a magnetic gripper such as electromagnet(s) or the like, which allows picking the items 12 at the first item location 16, temporarily maintaining and releasing the items 12 at the grouping station 18. In an embodiment, the prehension device of the prehension end-effector 26 of the grouping manipulator 20 can include two or more prehension heads or zones, actuatable independently. For instance, a first one of the heads or zones can be first actuated to pick one or more of the items 12 at the first item location 16 and a second one of the heads or zones can be subsequently actuated to pick another one or more of the items 12 at the first item location 16. It will be understood that the first item location 16 of the first item to be grasped by the first one of the heads or zones can be the same or can be different from the first item location 16 of the subsequent items to be grasped by the second one of the heads or zones.

One skilled in the art will understand that, in an alternative embodiment, the grouping manipulator 20 can be another type of manipulator using at least two degrees of freedom and which allows manipulation or grouping of items at a relatively high speed. It is understood that, in order to perform the picking, retention, displacement and grouping, the grouping manipulator 20 requires using at least two degrees of freedom (one degree of freedom for the upward/downward movement (along the "Y" axis) for picking and releasing the items 12 and at least one degree of freedom for displacement of the item along the "X" and/or "Z" axis, between the first item location 16 along the production line and the grouping station 18).

In another embodiment, the grouping manipulator 20 can also be another manipulator or mechanism which allow the items 12 carried on the item carrier 16a to be regrouped, such as for example and without being limitative a pusher, or the like. For example and without being limitative, in an embodiment, the grouping manipulator 20 picks the items from the first item location 16 and group the picked items 12 onto the grouping station 18 at a rate of at least 40 items/minute. One skilled in the art will understand that, in an embodiment the grouping manipulator 20 can include more than one assembly picking the items 12 from the first item location 16 and grouping the picked items 12 at the grouping station 18.

Still referring to FIGS. 2, 3*a* and 3*b*, in an embodiment, the placing manipulator 30 is a manipulator operative to pick the group of items 13 from the grouping station 18, displace and orient the group of items 13 and release the group of items 13 at the receiving station 15, for instance into the receiving space defined in the container 15*a* according to a predetermined configuration (i.e. a receiving orientation different from the first item orientation). Once again the placing manipulator 30 is one of a robotic manipulator assembly and a dedicated automated manipulator assembly. In an embodiment, the placing manipulator 30 is a serial robot 31 having five or six degrees of freedom in order to displace the group of items 13 between the grouping station 18 and the receiving station 15 and to perform manipulation, including change in orientation (rotation around the "X" and/or "Z" axes), of the group of items 13 to reach the predetermined configuration. As can be seen in FIGS. 2, 3*a*, and 3*b*, the serial robot 31 includes a series of links 32 connected by motor-actuated joints 34 ending in a prehension end-effector 36 which interacts with the group of items 13. Once again, the prehension end-effector 36 includes a prehension device designed to interact and, more particularly, seize, grasp or pick the group of items 13, retain the items 12 of the group of items 13 and subsequently release them. The nature of the prehension device of the prehension end-effector 26 can vary in accordance with the characteristics of the group of items 13 to be seized, grasped or picked, retained and released.

In the shown and non-limitative embodiment, the device of the prehension end-effector 36 of the robot 31 is embodied by a mechanical gripper 38 which allows the capture, maintenance, and release of the group of items 13. In an embodiment, the mechanical gripper 38 picks and maintains the group of items 13 by clamping the group of items 13 between an upper finger 38*a* and a lower finger 38*b* and releases the group of items 13 by subsequently opening the fingers 38*a*, 38*b*, i.e. by moving the fingers 38*a*, 38*b* away from one another. In a non-limitative embodiment, the lower finger 38*b* includes a plurality of prehension members (or fingers), spaced apart from one another, and movable into slits 18*a* of the grouping station 18. The movement of the lower finger 38*b* into the slits 18*a* of the grouping station 18 allows the lower finger 38*b* to move under the group of items 13 such that the group of items 13 is received between the upper finger 38*a* and the lower finger 38*b* for subsequent clamping thereof. One skilled in the art will understand that, in alternative embodiments, the prehension device of the prehension end-effector 36 can be embodied by a mechanical gripper 38 having a configuration different from the one described above or by another type of prehension device which allows the picking, temporary maintaining and subsequent releasing of the group of items 13 at the receiving station 15, such as inside the receiving space defined in the container 15*a*. The prehension device of the prehension end-effector 36 can also differ from the above-described embodiment and can include, for instance and without being limitative, vacuum-based prehension device(s), magnetic prehension device(s), such as electromagnet(s), and the like.

One skilled in the art will understand that, in an alternative embodiment, the placing manipulator 30 can be another type of manipulator using at least four degrees of freedom, which corresponds to the minimal requisite freedom to perform the manipulation, including the change in orientation, of the group of items 13 such as to place the group of items 13 at the receiving station 15 according to the predetermined configuration. For example, in an embodiment (not shown), the placing manipulator 30 can be configured to perform only a displacement and a change in the orientation of the group of items 13 during manipulation thereof, in order to place the group of items 13 in the receiving space defined in the container 15*a* according to the predetermined configuration. Indeed, each one of the items 12 can be rotated about axis "Y", to change their direction, by the grouping manipulator 20 such that each item 12 of the group of items 13 is already rotated appropriately (i.e. in the desired direction) or the items 12 can be originally configured appropriately with respect to their direction at the first item location 16, such as the section of the item carrier 16*a*, such that no rotation thereof around the axis "Y" is required by the placing manipulator 30. In an embodiment, the placing manipulator 30 does not perform a change of direction of the items 12 and, thus, the task performed by the placing manipulator 30 is free of direction change. One skilled in the art will understand that, in an embodiment, the placing manipulator 30 can include more than one assembly picking groups of items 13 from the grouping station 18 and releasing the groups of items 13 at the receiving station 15.

The grouping manipulator 20 and the placing manipulator 30 can be operatively connected to a controller which synchronizes the placing manipulator 30 with the grouping manipulator 20 and vice-versa. Furthermore, the controller can be further operatively connected to the item carrier 16*a*, such as an item conveyor, and a receiving carrier 17, such as a container conveyor. The grouping manipulator 20 and/or the placing manipulator 30 can be further operatively connected to a vision system to detect the items 12 and their configuration (i.e. their orientation and/or direction).

The combination of the grouping manipulator 20 and the placing manipulator 30 allows the apparatus 10 to pick the items 12 from the first item location 16, such as the section of the item carrier 16*a*, and group the items 12 at a relatively high pace and to subsequently place the group of items 13 at the receiving station 15, such as in the receiving space defined in the container 15*a*, with the required degree of freedom to reach the predetermined configuration of the items 12 at the receiving station 15. One skilled in the art will understand that, when a receiving space defined in the container 15*a* is used as the receiving station 15, the items 12 are inserted in the receiving space defined in the container 15*a* in the predetermined configuration until the container 15*a* is filled. Indeed, the use of the grouping manipulator 20 to seize the items 12 from the first item location 16, such as the section of the item carrier 16*a*, and grouping thereof allows a high seizing and grouping pace and the use of the placing manipulator 30 allows the group of items 13 to be manipulated with a high degree of precision such as to be inserted at the receiving station 15, such as the receiving space defined in the container 15*a*, with the desired orientation. Hence, the lower operational speed of the placing manipulator 30 (in comparison to the grouping manipulator 20), which is associated with the higher degree of precision thereof, is balanced by the placing manipulator 30 manipulating a plurality of grouped items 13 regrouped by the grouping manipulator 20 in order to perform the placement of the items 12 at the receiving station 15 at high speed and with high agility.

One skilled in the art will understand that, in an embodiment, more than one apparatus 10 for displacing and positioning items 12, such as an apparatus for packing items 12 in a container 15*a*, can be provided sequentially in order to displace and orient, and, in some implementations, pack the items 12 carried by the item carrier(s) 16 into corresponding containers 15a or other suitable receiving stations 15. One skilled in the art will understand that, in such an embodiment, each one of the apparatus 10 for displacing and positioning items 12 can operate to release the items 12 at the receiving stations 15, according to a similar or a different configuration.

For an implementation wherein the apparatus 10 is conceived to pack the items 12 into a receiving space defined in a container 15a, the containers 15a can be carried along a production line by the receiving carrier 17, with the containers 15a being filled when they go through a packing station.

Now referring to FIGS. 4 and 5, methods for displacing and placing items in a predetermined configuration using the apparatus 10 as described above, such as packaging sequences for packing items 12 into the receiving space defined in the container 15a, will now be described. It is appreciated that, in alternative embodiments, the container 15a shown in these figures can be replaced by any suitable receiving station 15.

In the embodiment shown, the items 12 are conveyed on the item carrier 16a embodied by an item conveyor, along a production line aligned with axis "X". One skilled in the art will understand that, in an alternative embodiment, the items 12 can be carried towards the apparatus 10 by any mechanical handling system, which displaces items 12 from one location to another, different from the shown item conveyor. The initial step of the methods for displacing and placing items in a predetermined configuration is the picking of each one of the items 12 at the first item location 16 and the grouping of the items 12 into at least one group of items 13 at the grouping station 18. In an embodiment, the grouping of the items 12 into at least one group of items 13 is performed by picking of each one of the items 12 at the first item location 16 by an upper face thereof and stacking the items 12 on top of one another at the grouping station 18. However, one skilled in the art would understand that, in alternative embodiments, the items 12 can be picked and grouped according to different grouping configurations. As mentioned above, this initial step is performed by a grouping manipulator 20 which operates at a relatively high picking and grouping speed with respect to the placing manipulator 30.

The items 12 of one group 13 can be picked sequentially or simultaneously by the grouping manipulator 20. For instance, the grouping manipulator 20 can pick one or more items 12 in each item picking sequence and one or more item picking sequence(s) can be performed to form one group 13. An item picking sequence for the grouping manipulator 20 comprises the steps of: seizing one or more items 12 at the first item location 16, displacing simultaneously the seized item(s) 12 towards the grouping station 18 and, if needed, changing its/their direction by rotating them around the "Y" axis, and releasing the seized items 12 on the grouping station 18. During one item picking sequence and if more than one item 12 is seized, the items 12 can be seized simultaneously or sequentially. For instance, for an item picking sequence including seizing two items 12, the items 12 can be seized simultaneously by the prehension end-effector 26 of the grouping manipulator 20, i.e. performing the steps of seizing the two items 12 in a same picking step, displacing the two items 12 simultaneously towards the grouping station 18 and, if needed, change their direction by rotating them around the "Y" axis, and releasing the two items 12 on the grouping station 18. In an alternative embodiment, for an item picking sequence including seizing two items 12, the items 12 can be seized sequentially, i.e. performing the steps of seizing a first one of the items 12 in a first picking step, seizing a second one of the items 12 in a second picking step, then, displacing the two seized items 12 simultaneously towards the grouping station 18 and, if needed, changing their direction by rotating them around the "Y" axis, and releasing the two items 12 on the grouping station 18. Similarly, in one item picking sequence, the items 12 can be released simultaneously or sequentially on the grouping station 18. As mentioned above, the first item location 16 of the first seized item(s) 12 can be the same or can be different from the first item location 16 of the second seized item(s) 12.

Thus, to form one group of items 13, the grouping manipulator 20 can carry out one or more item picking sequence and, during each one of the item picking sequence, one or more items 12 can be displaced and released at the grouping station 18.

Subsequently, each group of items 13, including at least two items 12, is picked from the grouping station 18 and is manipulated to be placed at the receiving station 15. In the embodiment shown, the receiving station 15 is a receiving space defined in a container 15a in which the items 12 are inserted, according to the predetermined configuration. As mentioned above, this subsequent step is performed by the placing manipulator 30 having a higher degree of freedom than the grouping manipulator 20. In an embodiment, the manipulation of each group of items 13 includes varying the orientation of the plane "P" of the group of items 13 by rotating the group of items 13 around axis "X" and/or "Z".

Even if the grouping manipulator 20 can carry out more than one item picking sequence to form each group of items 13, the placing manipulator 30 carries out a single group picking sequence to displace and orient the group of items 13 between the grouping station 18 and the receiving station 15, such as the receiving space defined in the container 15a. A group picking sequence for the placing manipulator 30 comprises the steps of: seizing one group of items 13 including at least two items at the grouping station 18, displacing the seized group of items 13 towards the receiving station 15, changing the orientation of the plane "P" of the group of items 13 by rotating the group of items 13 around axis "X" and/or "Z", and releasing the seized group of items 13 at the receiving station 15 in the predetermined configuration.

In an embodiment where the items 12 are packed into a receiving space defined in a container 15a, the containers 15a into which the group of items 13 is to be placed are conveyed on a receiving carrier 17, such as a receiving conveyor, with a path proximate to the item carrier 16a. In an embodiment, the receiving carrier 17 is inclined, i.e. its carrying surface defines an oblique angle with the horizontal plane, in order to help in the appropriate placement of the items 12 inside the container 15a. One skilled in the art will understand that, in alternative embodiments, other mechanisms for displacing the containers 15a within the reach of the placing manipulator 30 can be used.

Figure 4A:
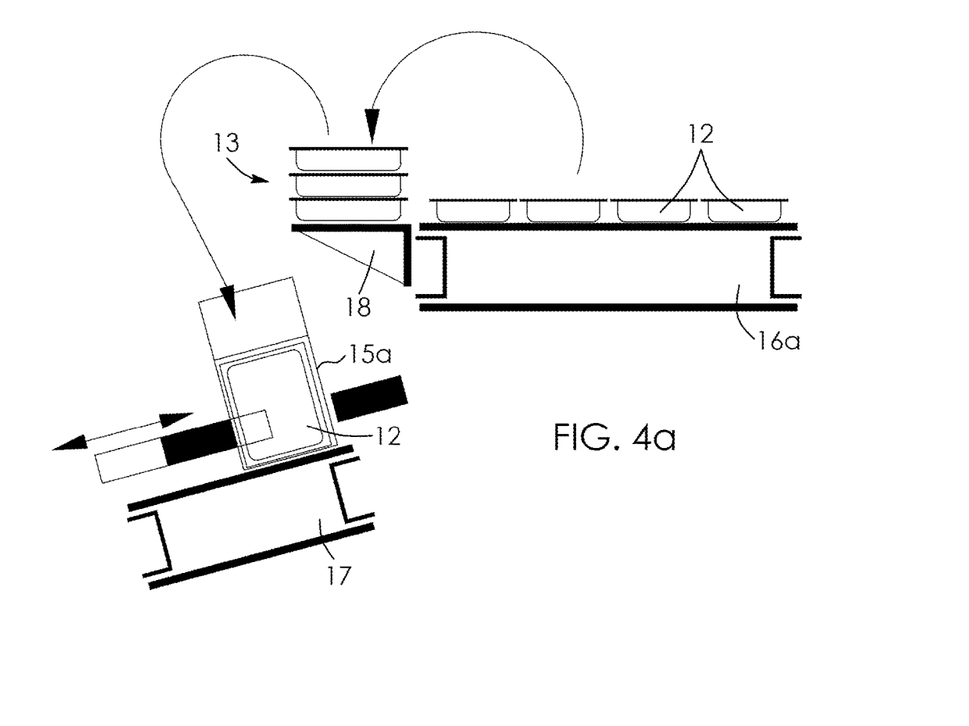
FIG. 4a is a schematic representation of a packaging sequence for packing items in a container using the apparatus shown in FIG. 2, according to an embodiment where the items are configured such that a display face of the items is substantially perpendicular to a travel axis of the container.
Figure 4B:
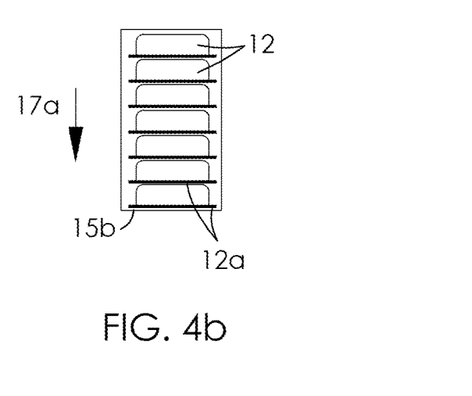

In the embodiment shown in FIGS. 4a and 4b, during the manipulation of the group of items 13, the group of items 13 is displaced from the grouping station 18 to the receiving space defined in the container 15a by the placing manipulator 30. The group of items 13 is rotated about axes "X" and/or "Z" and the orientation of the items 13 is changed such that the items 12 are configured in the predetermined configuration which, in the embodiment shown is a substantially vertical configuration. Referring to FIG. 4b, it can be seen that, in the embodiment shown, the predetermined configuration of the items 12 in the receiving space defined in the container 15a is a configuration where a display face 12a of the items 12 is substantially perpendicular to a travel axis 17a according to which the containers 15a are carried on the receiving carrier 17. In other words, the plane of the items 12 in the receiving space defined in the container 15a is substantially perpendicular to its orientation at the first item location 16 and each item 12 has been rotated about 90° by the placing manipulator 30 about the axis "X" to change its orientation. In the embodiment shown, a single row of items 12 is formed inside the container 15a. One skilled in the art would however understand that, in an alternative embodiment, more than one row of items 12 can be formed inside the container 15a. It will be understood that, to fill the receiving space defined in the container 15a, the placing manipulator 30 can carry out one or more group picking sequence(s). In the embodiment shown, a removable section 15b of the container 15a covers at least a portion of the face of the container 15a towards which the display faces 12a of the items 12 are oriented. When the removable section 15b is removed from the container 15a, for example in a store, the items 12 are configured in a display ready configuration where the display face 12a of each one of the items 12 faces an aperture in the container 15a created by the removal of the removable section 15b.

Figure 5A:
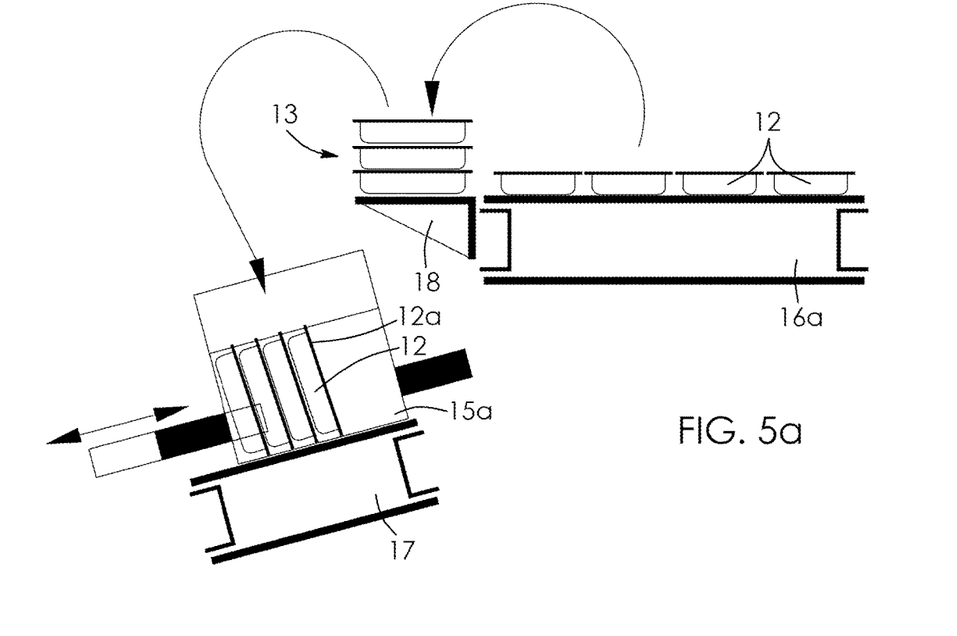
FIG. 5a is a schematic representation of another packaging sequence for packing items in the container using the apparatus shown in FIG. 2, according to an embodiment, where the items are configured such that the display face of the items is substantially parallel to the travel axis of the container.
Figure 5B:
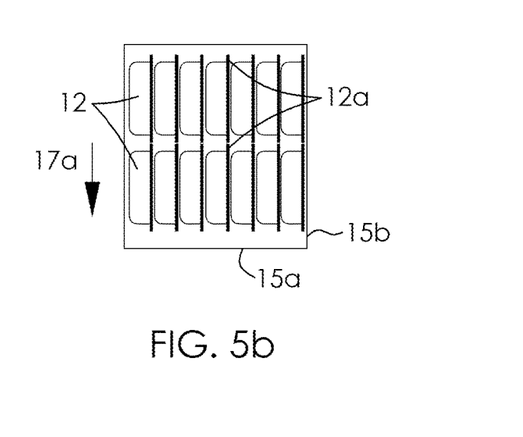

In the embodiment shown in FIGS. 5a and 5b, during the manipulation of the group of items 13, the group of items 13 is displaced from the grouping station 18 to the receiving space defined in the container 15a and its orientation is modified by the placing manipulator 30 such that the items 12 are configured in the predetermined configuration, which, in the embodiment shown is a substantially vertical configuration. Referring to FIG. 5b, it can be seen that the predetermined configuration of the items 12 in the receiving space defined in the container 15a is a configuration where the display face 12a of the items 12 is substantially parallel to the travel axis 17a according to which the containers 15a are carried on the receiving carrier 17. Once again, the plane of the items 12 in the container 15a is substantially perpendicular to its orientation at the first item location 16. However, in the embodiment of FIGS. 5a and 5b, the items 12 have been rotated about 90° by the placing manipulator 30 about the axis "Z" to change their orientation. In the embodiment shown, two rows of items 12 are formed inside the container 15a. One skilled in the art would however understand that, in an alternative embodiment, a single row or more than two rows of items 12 can be formed inside the container 15a. Once again, to fill the receiving space defined in the container 15a, the placing manipulator 30 can carry out several consecutive group picking sequence(s). Once again, in the embodiment shown, a removable section 15b of the container 15a covers at least a portion of the face of the container 15a towards which the display faces 12a of the items 12 are oriented. When the removable section 15b is removed from the container 15a, for example in a store, the items 12 are configured in a display ready configuration where the display face 12a of each one of the items 12 faces the aperture in the container created by the removal of the removable section 15b.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. An apparatus for displacing and positioning items in a predetermined configuration, the apparatus comprising:
   a grouping station;
   a grouping manipulator using at least two degrees of freedom and having a prehension end-effector, the grouping manipulator being configured to pick items at a first item location, displace the items towards the grouping station, and release the items at the grouping station to form a group of items; and
   a placing manipulator using at least four degrees of freedom and having a prehension end-effector, the placing manipulator being configured to seize the group of items at the grouping station, at least partially lift the group of items above the grouping station; change an orientation of the group of items, and release the group of items at a receiving station in the predetermined configuration.

2. The apparatus of claim 1, further comprising an item carrier from which the items are picked at the first item location by the grouping manipulator, the item carrier extending along a production line aligned with an axis "X", having a transversal axis "Z", the axes "X" and "Z" being perpendicular to an axis "Y", and wherein the prehension end-effector of the grouping manipulator is displaceable along at least the "Y" and "Z" axes and is rotatable around the "Y" axis.

3. The apparatus of claim 2, wherein the placing manipulator comprises a serial robot having five or six degrees of freedom and the prehension end-effector of the placing manipulator is displaceable along the "X", "Y" and "Z" axes and is rotatable about at least one of the "X" and "Z" axes and comprises at least one prehension device operative to pick, maintain and release the items.

4. The apparatus of claim 1, wherein the receiving station is inside a container, the apparatus further comprising a container carrier supporting and displacing the container.

5. The apparatus of claim 1, wherein the grouping manipulator comprises a parallel robot having three or four degrees of freedom, the prehension end-effector of the grouping manipulator comprising at least one prehension device operative to pick, maintain and release the items and the grouping manipulator is rotatable to perform a change of direction of a picked item, between the first item location and the grouping station.

6. The apparatus of claim 1, further comprising an item carrier from which the items are picked at the first item location by the grouping manipulator, the grouping station being spaced-apart from the item carrier.

7. The apparatus of claim 1, wherein the grouping station receives the items in a first direction.

8. The apparatus of claim 1, further comprising an item carrier from which the items are picked at the first item location by the grouping manipulator, the grouping station being stationary with respect to the item carrier.

9. A method of displacing and positioning items in a predetermined configuration, the method comprising the steps of:
picking the items from a first item location, displacing the items towards a grouping station, and releasing the items at the grouping station to group the items; and
picking the group of items at the grouping station, at least partially lifting the group of item above the grouping station, varying an orientation of the group of items, and releasing the group of items at a receiving station in the predetermined configuration.

10. The method of claim 9, wherein grouping of the items into the at least one group of items is performed by stacking the items into a pile.

11. The method of claim 9, wherein picking the items from the first item location and grouping the items into a group of items at the grouping station comprises rotating the items to change a direction thereof.

12. The method of claim 9, wherein picking the items from a first item location comprises picking at least two of the items sequentially.

13. The method of claim 9, wherein picking the items from a first item location comprises picking at least two of the items simultaneously.

14. The method of claim 9, wherein picking the items from a first item location and grouping the items into a group of items comprises displacing the at least one item from the first item location to the grouping station and displacing the at least one item comprises rotating each one of the items to change a direction thereof.

15. The method of claim 9, wherein the receiving station comprises a receiving space defined in a container, and wherein releasing the group of items at a receiving station in the predetermined configuration comprises releasing the group of items in the receiving space of the container.

16. The method of claim 9, further comprising conveying the items along a production line including the first item location and the production line is aligned with an axis "X" and has a transversal axis "Z", the axes "X" and "Z" being perpendicular to an axis "Y", and wherein picking the items from a first item location and grouping the items into a group of items at the grouping station comprises displacing the at least one item along at least one of the axes "Z" and "Y".

17. The method of claim 16, wherein displacing the at least one item along at least one of the axes "Z" and "Y" comprises rotating the at least one item around the axis "Y".

18. The method of claim 9, wherein all of the items of the group of items are sequentially picked or displaced or released at the grouping station.

19. The method of claim 9, wherein the first item location is located on an item carrier and the grouping station is stationary with respect to the item carrier and spaced-apart from the item carrier.

20. The method of claim 9, wherein the group of items is positioned in accordance with a first direction at the grouping station and in accordance with a second direction, different from the first direction, at the receiving station.

21. An apparatus for placing items in a predetermined configuration, the apparatus comprising:
a first item location configured to receive items in a first item orientation;
a stationary grouping station spaced-apart from the first item location and configured to receive items in the first item orientation;
a receiving station spaced-apart from the first item location and the stationary grouping station and configured to receive items in a receiving orientation different from the first item orientation;
a grouping manipulator having a prehension end-effector and being configured to pick items at the first item location, displace the items towards the stationary grouping station, and release the items in the first item orientation on the stationary grouping station to group the items into a group of items; and
a placing manipulator having a prehension end-effector and being rotatable about at least one rotation axis, the placing manipulator being configured to pick the group of items at the stationary grouping station, at least partially lift the group of items above the stationary grouping station, displace the group of items towards the receiving station, rotate the group of items from the first item orientation to the receiving orientation, and release the group of items at the receiving station in the predetermined configuration.

22. The apparatus of claim 21, wherein the grouping manipulator uses at least two degrees of freedom and the placing manipulator uses at least four degrees of freedom.

23. The apparatus of claim 22, wherein the grouping manipulator has three or four degrees of freedom and the placing manipulator has five or six degrees of freedom.

24. The apparatus of claim 21, wherein the grouping manipulator is rotatable to perform a change of direction of a picked item, between the first item location and the stationary grouping station.

25. The apparatus of claim 21, further comprising an item carrier from which the items are picked at the first item location by the grouping manipulator and the item carrier extends along a production line aligned with an axis "X", having a transversal axis "Z", the axes "X" and "Z" being perpendicular to an axis "Y", and wherein the prehension end-effector of the grouping manipulator is displaceable along at least the "Y" and "Z" axes and is rotatable around the "Y" axis.

26. The apparatus of claim 21, wherein the items have a plane aligned with a support surface of the items at the first item location and an orientation of the plane of the items remains unchanged by the grouping manipulator and the support surface of the items at the first item location is substantially parallel to the support surface of the items at the stationary grouping station and, at the first item location, the items are received in a first direction, and, at the stationary grouping station, the items are received in a second direction, different from the first direction.

27. The apparatus of claim 21, wherein the items have a direction at the first item location and the grouping manipulator is rotatable to change the direction of the items between the first item location and the stationary grouping station.

28. A method of displacing and placing items in a predetermined configuration, the method comprising the steps of:
picking at least one item in a first item orientation from a first item location;
displacing the at least one item from the first item location to a grouping station;
releasing the at least one item at the grouping station in the first item orientation to form a group of items at the grouping station;
picking the group of items at the grouping station;
at least partially lifting the group of items above the grouping station;
displacing the group of items towards a receiving station;
changing an orientation of the group of items from the first item orientation to a receiving orientation; and releasing the group of items at the receiving station in the predetermined configuration.

29. The method of claim 28, wherein the steps of picking at least one item in a first item orientation from a first item location, displacing the at least one item from the first item location to the grouping station and releasing the at least one item at the grouping station in the first item orientation to form a group of items at the grouping station are carried out at least twice to form the group of items.

30. The method of claim 28, wherein displacing the at least one item from the first item location to the grouping station comprises rotating the at least one item to change a direction of the at least one item.

31. The method of claim 28, wherein each one of the at least one item comprises a plane aligned with a support surface at the first item location and wherein displacing the at least one item from the first item location to the grouping station comprises rotating the at least one item about an axis perpendicular to its plane to change a direction thereof.

32. The method of claim 28, wherein each one of the at least one item comprises a plane aligned with a support surface at the first item location and wherein changing an orientation of the group of items from the first item orientation to a receiving orientation comprises rotating the group of items about an axis substantially aligned with the plane of the items to change the orientation of the group of items.

33. The method of claim 28, wherein the steps of picking at least one item in a first item orientation from a first item location, displacing the at least one item from the first item location to the grouping station and releasing the at least one item at the grouping station in the first item orientation to form a group of items at the grouping station are carried out for all of the items of the group of items.

* * * * *